Sept. 19, 1967     J. V. GANZINOTTI     3,341,974
REFRIGERATOR DOOR SEAL
Filed May 5, 1965     2 Sheets-Sheet 1
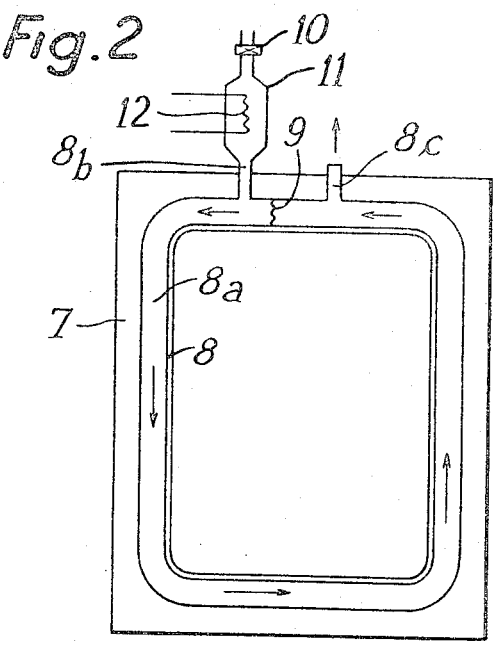
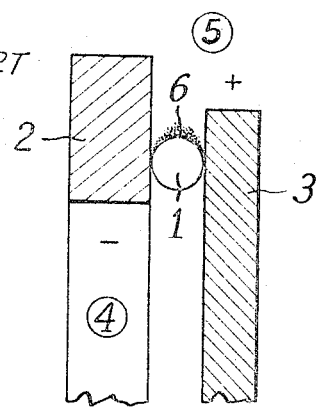
INVENTOR
J. V. Ganzinotti
ATTORNEYS

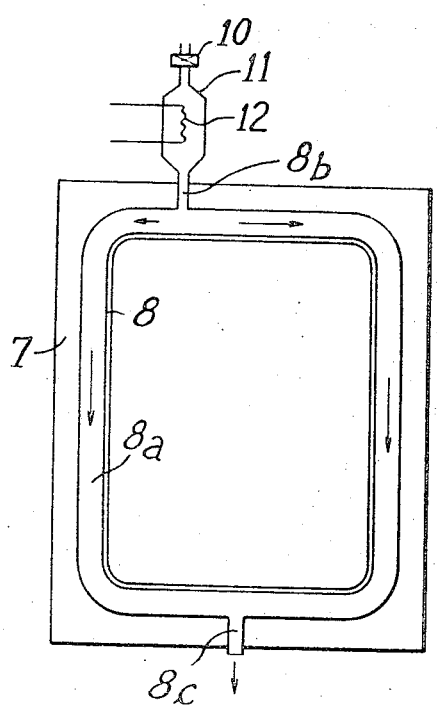
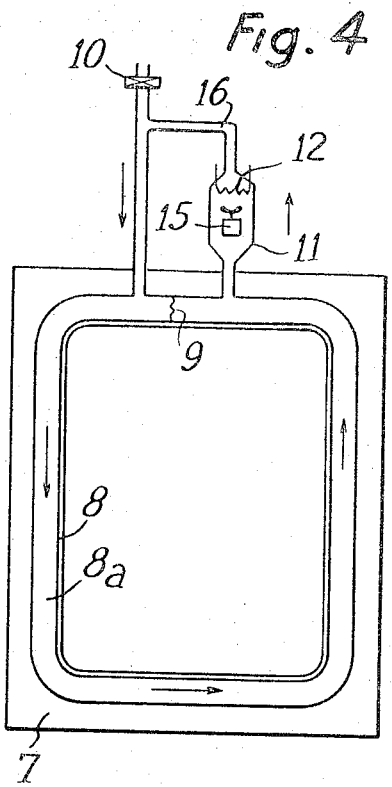
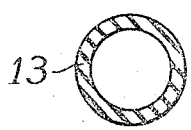
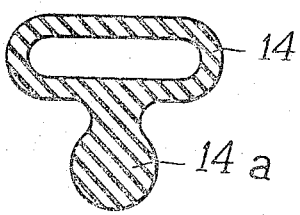

United States Patent Office 3,341,974
Patented Sept. 19, 1967

3,341,974
REFRIGERATOR DOOR SEAL
Jean Victor Ganzinotti, Brive, France, assignor to Etablissements Maille et Vagneux and Equipement Moderne Industriel par Application du Caoutchouc Manufacture et des Plastiques "EMI," both of Paris, France, both corporations of France
Filed May 5, 1965, Ser. No. 453,251
7 Claims. (Cl. 49—477)

ABSTRACT OF THE DISCLOSURE

A sealing joint for a refrigerator door which is heated to prevent the formation of frost thereon.

---

In all refrigerated enclosures, a sealing joint is disposed between the fixed part of the door frame or surround and the movable part of the door proper, made from a thermally insulating substance.

When the door is closed and the temperature within the enclosure is substantially lower than 0° C., the sealing joint or member, which is not made of a thermally insulating substance, is cooled so effectively that its parts in contact with the external atmosphere form a cold wall and become covered with frost. The harmful effects of this frost are well known, namely that it is difficult and even sometimes impossible to open the door, and that the joint is liable to deteriorate.

In order to avoid this disadvantage, formation of frost is often prevented by arranging an electrical heating resistance element near the joint. Whilst being quite satisfactory, this solution is costly and it does not generally allow the joint to be uniformly reheated.

Devices are also known in which a conduit is arranged between the door and the frame, through which a fluid is made to circulate, the temperature of which is greater than 0° C. Apart from the fact that the results obtained are not entirely satisfactory, this solution is difficult to apply to sliding doors.

The present invention has for an object a method of defrosting the sealing joints of refrigerator doors, which method is particularly simple, effective and economical.

To be more precise, the formation of frost on the sealing joint of refrigerator doors is prevented by causing a fluid, which is sufficiently hot to reheat the joint and to prevent the deposits of frost on its surface and on the areas adjacent the door and the door frame, to circulate in a longitudinal channel provided for this purpose in the joint.

The fluid circulating in the joint may advantageously be re-circulated by being reheated at the beginning of each circulation cycle. It may alternatively be evacuated from the joint through an escape or outlet aperture, after circulation.

In the device according to the invention, a hollow joint is used for the circulation of the reheating fluid. It is advantageous to use an inflatable joint, i.e. a joint which expands under the effect of the pressure of the liquid and to use the inflating fluid as a reheating fluid.

The invention also relates to installations serving to effect a seal of a refrigerator door comprising, in combination, a sealing joint provided with at least one internal channel, means for causing a fluid to circulate in this channel, and means for reheating the fluid before its introduction into the joint.

In order that the invention may be more readily understood, reference will now be made to the accompanying drawing, in which:

FIGURE 1 illustrates the phenomenon of frosting of prior sealing joint as previously mentioned, FIGURE 2 diagrammatically shows one embodiment of the invention in which the heated fluid, after circulation, is not recycled, FIGURE 3 shows a variant of the installation of FIGURE 2.

FIGURE 4 diagrammatically shows another embodiment of the invention, in which the heated fluid is recycled.

FIGURES 5a and 6b show, in section, two types of sealing joint for installations according to the invention.

FIGURE 1 diagrammatically shows, in partial section, an assembly which produces the frosting phenomenon. This assembly comprises a joint 1 interposed between a door frame 2 and a door 3 of a refrigerator, so as to effect a seal between the interior 4 and the exterior 5 of the refrigerator. The surface of the joint in contact with the external atmosphere, which is always substantially covered with water vapour, is covered by a film 6 of frost, as are the surfaces adjacent the door 2 and the frame 3.

FIGURE 2 diagrammatically shows the frame 7 of a door, around which is mounted a hollow sealing joint 8, having a longitudinal channel 8a. This joint 8 may or may not be inflatable. If it is inflatable, the channel 8a receives the inflating fluid, which is the same as the fluid for reheating the joint. In any case the reheating fluid enters the channel 8a through an input duct 8b, and leaves through an outlet aperture 8c, whilst circulation takes place in the direction of the arrows. The joint 8 is uniform over the whole of its length and has an internal separating partition 9 situated between the outlets 8b and 8c. In the case of an inflatable joint, the partition 9 is preferably undulated or corrugated so as to allow for the expansion of the channel 8a, in which case a flexible closing stopper may also be used, the stopper being made of a supple or resilient cellular substance. The reheating fluid used is preferably a gas under an effectively low pressure. This gas leaves, for example a pressure-reducer 10 and enters a reservoir 11 connected to the inlet 8b, in which it is heated by an electrical resistance element 12. The joint 8 and the system associated therewith have been shown as being attached to the frame only by way of example: they could alternatively be attached to the door, flexible pipes then being incorporated in the input circuit of the reheating fluid. In this embodiment, the gas admitted into the reservoir 11 is dry air, and solid impurities have been removed therefrom. Since the joint is inflatable and has the form of a rectangle of 2 x 3m, the resistance element 12 has a power of 300W and the outflow of air is from 200–300 litres per hour at a pressure of 1.3–1.5 kg./cm.². The outlet aperture 8c comprises a constant pressure valve which maintains the pressure in the joint at a value between the said 1.3 and 1.5 kg./cm.². When the internal temperature is −30° C. and the external temperature is between +10 and +30° C., no frost appears on the joint.

FIGURES 5a and 5b show in section two possible alternative types of seal or joint; namely an ordinary hollow joint 13 (FIGURE 5a) and an inflatable joint 14 having a mounting appendix 14a.

FIGURE 3 shows an installation which differs from that of FIGURE 2 only in that the separating partition 9 is omitted the outlet 8c being substantially opposite the inlet 8b, and the circulation of fluid thus being established in two opposite directions (see arrows).

FIGURE 4 represents a similar installation, in which the reheating fluid is recycled, it being reheated between cycles. This is effected by means of a circulation pump 15 and a recycling channel 16, cyclic circulation being effected in the direction of the arrows.

I claim:

1. A device for preventing the formation of frost on the sealing joint of a refrigerator door, comprising a joint encircling said door and formed with an internal longitudinal passageway for circulating a heating fluid, a transverse partition blocking said passageway at one point, an input duct on one side of said partition for introducing a heating fluid into said passageway, an outlet on the other side of said partition for withdrawing said heating fluid from said passageway, and means associated with said injut duct for heating said heating fluid as it flows through said duct.

2. A device as claimed in claim 1 in which said heating means is a reservoir connected to supply said input duct and containing a heating element.

3. A device according to claim 1, in which the fluid is a gas.

4. A device according to claim 1, in which, after circulating in the joint, the fluid escapes into the atmosphere.

5. A device according to claim 1, in which, after circulating in the joint, the fluid is re-circulated, the fluid being reheated periodically and preferably before each cycle.

6. A device according to claim 1, in which the joint is an inflatable joint, and the fluid serves to inflate the joint.

7. A device according to claim 1, in which the joint is inflatable and the partition is extensible.

References Cited
UNITED STATES PATENTS

| | | | |
|---|---|---|---|
| 2,420,240 | 5/1947 | Haggerty | 49—70 X |
| 2,469,131 | 5/1949 | Ross | 49—477 |
| 3,124,852 | 3/1964 | Holderer | 49—477 |
| 3,178,779 | 4/1965 | Clark et al. | 49—477 |

DAVID J. WILLIAMOWSKY, *Primary Examiner.*

HARRISON R. MOSELEY, *Examiner.*

P. C. KANNAN, *Assistant Examiner.*